Sept. 28, 1948.　　　P. W. KLIPSCH　　　2,450,003
ROTATING BAND TESTER
Filed July 23, 1945
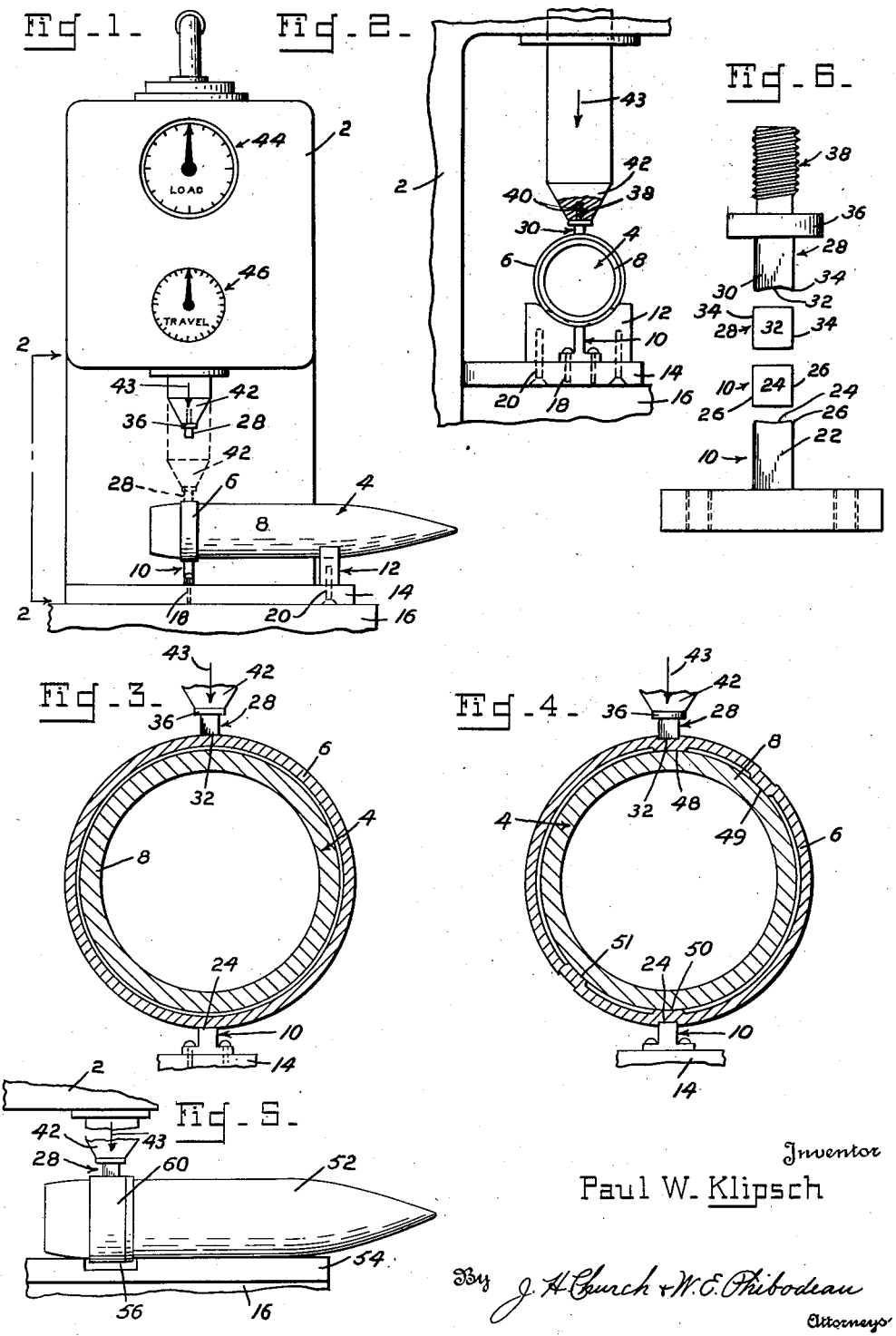
Inventor
Paul W. Klipsch
By J. H. Church & W. E. Thibodeau
Attorneys Patented Sept. 28, 1948

2,450,003

UNITED STATES PATENT OFFICE 2,450,003

ROTATING BAND TESTER

Paul W. Klipsch, Hope, Ark.

Application July 23, 1945, Serial No. 606,697

3 Claims. (Cl. 73—167)

(Granted under the act of March 3, 1883, as amended April 30, 1928; 370 O. G. 757)

The invention described herein may be manufactured and used by or for the Government for governmental purposes without the payment to me of any royalty thereon.

This invention relates to the inspection and testing of artillery ammunition.

An object of the invention is to provide a means of ascertaining whether the rotating band on an artillery shell is loose or tight with relation to the shell body.

A further object of the invention is to provide a means for ascertaining the degree of looseness or the amount of actual clearance existing between the rotating band and the shell body.

Another object of the invention is to provide a means as described above, in the use of which neither the shell body nor the rotating band is deformed to an extent sufficient to impair its fitness for use thereafter in firing a gun.

Another object of the invention is to provide a testing device such as described above, which is adaptable for use in standard testing machines, thus avoiding excessive cost of inspection by means of this device.

Other objects and advantages of the invention will become apparent from the following description of a preferred embodiment thereof as illustrated in the accompanying drawings in which, Figure 1 is a view of a testing machine showing a shell in position for test for looseness of its rotating band, Figure 2 is a side elevation, slightly enlarged and partly broken out, taken along line 2—2 of Figure 1, Figure 3 is an enlarged detail view taken from Figures 1 and 2 but showing only the shell being tested, in cross-section, and the upper and lower indenters, just prior to the indenting operation, Figure 4 is a view similar to Figure 3 except that it shows one pair of indentations already made, and the indenters just having completed making a second pair of indentations in the rotating band, Figure 5 shows a modified form of test set-up using only one indenter, and Figure 6 shows detail side elevations of the upper and lower indenters and between them shows face views of their respective contact faces only.

That loose rotating bands affect shell velocity has long been recognized. Heretofore quantitative correlation between rotating band looseness and shell velocity has not been possible because looseness on a given shell could not be measured and that same shell subsequently fired for measuring its velocity. To overcome this difficulty, the present invention provides a method of determining the extent of rotating band looseness without preventing the subsequent firing of the shell as a check on the looseness measurement.

Briefly, this method comprises pressing an indenter into the rotating band until the under surface of the rotating metal band just beneath the indenter is pressed firmly against the iron or shell surface of the shell body with the requisite degree of tightness, and then measuring the amount of travel required of the indenter to effect the desired degree of indentation.

It is important to note that the method proposed herein does not destroy or harm the rotating band in any way, so that the shell is entirely just as suitable for being fired after the test as it was before the test. The validity of the indentation method of test, as described herein, has been established beyond question by actual application thereof to thousands of shells at an Ordnance Department proving ground. The shells were first tested for degree of looseness of rotating band and then fired, the looseness for each shell then being correlated with the velocity of the shell. It was found as a result, that the degree of clearance under the rotating band influences the velocity of the shell. Thus a tight rotating band will result in a higher initial gas pressure within the gun barrel and will also result in a higher mean effective pressure during travel of the shell through the gun tube, the result being a higher muzzle velocity of the shell.

As an illustration, the results may be cited of firing a shell having a tight band as compared with a similar size shell having a loose band. The tight banded shell exhibited a maximum or peak gas pressure in the gun tube of 12,700 pounds per square inch and a muzzle velocity of 1,023 feet per second, while the loosely banded shell exhibited a maximum gas pressure of only 9,800 pounds per square inch and a muzzle velocity of only 985 feet per second.

It is to be understood that where the outside diameter of the rotating band is below standard for the particular caliber of ammunition, the shell will be too loose in the gun tube, allowing gases to escape past it and thus also resulting in loss of pressure and velocity. In testing shells for looseness of rotating band on the shell body, it is thus of course requisite either that the outside diameter of the rotating bands be up to standard, or that appropriate corrections be introduced for the looseness between the rotating band and the gun tube inner surface, in evaluating the results.

A caliper or other type of gauge may be employed to measure the outside diameter of the rotating band. The present invention shows how to perform the more difficult task of measuring looseness between the inside surface of the rotating band and the outer surface of the shell body beneath the rotating band.

Referring now to the drawings, a testing machine 2, capable of providing a compressive load of appropriate pressure, has supported therein a shell 4 the looseness of whose rotating band 6 between the band and the shell body 8 beneath the band is to be determined. While one form of testing machine is illustrated, it is to be understood that this is merely for illustrative purposes, and that any one of the many excellent testing machines now on the market may be employed, regardless of manufacture, provided it affords means of applying an appropriate compressive stress and of measuring within an accuracy of several thousandths of an inch the degree of indentation of the rotating band by the indenters. Thus, for testing 105 millimeter shells it has been found that a machine capable of applying a total compressive load of up to 12,000 pounds will be suitable where ⅜ inch square indenters, suitably curved to fit the band curvature, are employed, the unit pressure exerted on the rotating band by the indenters being thus equal in pounds per square inch to the total compressive load divided by the area of the indenter at the contact with the band surface.

The shell 4 is arranged in position as shown in Figures 1 and 2, with its rotating band 6 supported on an upwardly projecting supporting shoe or indenter 10, the shell being otherwise supported by a V-block 12 as shown, the V-block 12 also preventing the shell from rolling off the supporting indenter 10. The supporting indenter 10 and V-block 12 are in turn supported on and secured to the upper surface of a flat base plate 14 which rests on the testing machine platform 16. Screws 18 and 20 may be employed for fastening the members 10 and 12 to the base plate 14. The lower supporting indenter 10, as illustrated, is in the form of an inverted T-shape as shown in Figure 6, the upright portion 22 of which is square in cross section, and, for 105 millimeter shells satisfactory results have been obtained where portion 22 is about ⅜ inch square in cross section. The upper surface 24 is curved to fit the curvature of the outer surface of the rotating band, the edges 26 being rounded off on about 1/16 inch radius.

The upper shoe or indenter 28 is shown in the illustrations as the movable indenter while the lower indenter 10 is shown as stationary. However, in some testing machines it may be more convenient to make the upper indenter stationary and the lower indenter movable. This may be done, for example, by causing the platform 16 bearing the lower indenter, V block and shell, to move upwards toward the upper indenter.

Referring again to the construction as shown in Figure 1, the upper indenter 28 has a downwardly projecting portion 30 which is square in cross section, being the same cross-sectional dimensions as upwardly projecting portion 22 of the lower indenter 10 and is similarly faced to fit the curve of the rotating band on its contact surface 32, and is similarly rounded off on the edges 34 as the lower indenter is rounded off on edges 26. The upper indenter 28 has a cylindrical collar 36 and threads at 38 for being threaded into a corresponding threaded recess 40 in the movable head 42 of the testing machine 2.

The upper and lower indenters are preferably made of mild steel, their contact faces 24 and 32 being ground to a desired contour and then hardened or being suitably tipped with a hardened steel portion, all in a manner well known in the metal working art.

In use as best seen in Figure 1, a shell 4 is placed, with its rotating band 6 resting on lower indenter 10, the shell being otherwise supported in a horizontal position, on V-block 12. The machine shown in Figure 1 has an upper scale 44 indicating total load in pounds, and a lower scale 46 indicating travel in inches and decimal fractions of an inch of the moving indenter. A machine may be obtained in which no movement of the pointer on scale 46 occurs until the upper indenter has reached the upper surface of the rotating band. In any case, the machine is operated until both upper and lower indenters are in contact with the rotating band, as shown in Figure 3, and the operation of the machine is then continued by applying the load until the upper and lower indenters have pressed the rotating band inner surface beneath them tightly against the outer surface of the shell body, as at 48 and 50, respectively, in Figure 4. Similar depressions of the rotating band may be made at various selected locations along the rotating band surface, as at 49 and 51, the inner band surface beneath the indentations being thus firmly seated against the abutting outer surface of the shell body. In the case of 105 millimeter shells, a suitable unit load was found to be approximately 71,000 pounds per square inch under the indenter pressure faces 24 and 32. This pressure was chosen, and may be verified, and should be occasionally checked, by indenting a loosely banded shell and removing the band for examination. Adequacy of indenting pressure is indicated when the under surfaces of the indented portions of the band, such as at 48 and 50 in Figure 4, are engraved by the tool marks on the shell body in the band seat. In using one type of testing machine proper indentation was obtained when the total load had been run up to 10,000 pounds. In the case of the machine illustrated in Figure 1, it was found that the total load indicated on gauge 44 should be about 11,000 pounds, since the operating mechanism of this machine, which allows the direct reading of travel of the indenters on the dial gauge 46, requires a slightly higher dead load to give an effective pressure on the indenter equivalent to 10,000 pounds dead load used on the other machine mentioned in the previous sentence above.

In use of the machine illustrated in Figure 1, there is assembled in conjunction with the movable upper indenter 28 the dial indicator 46 reading in thousandths of an inch so arranged that it measures the movement of the indenter in the direction of arrow 43 after the intenter has contacted the rotating band. Thus there is no motion of the dial indicator 46 while the indenter is moving freely before contact, but as soon as contact is made, any further motion of the indenter is indicated on the dial 46. The motion of the indenter 28 subsequent to contact with the band is the sum of the elastic deformation of the machine, the shell body and the band, plus the permanent deformation of the band by the indentation. Releasing the pressure after the desired total load has been reached, permitting the dial indicator 46 to come to zero and repressing at the same point will cause the upper indenter to come in contact with the band at the bottom of the indentation, and, therefore, the dial 46 indication will be that of the elastic deformation only since a second operation produces no further permanent deformation. The difference between the two readings on dial 46 is the total permanent deformation. For convenience, clearance under the band may be considered in terms of actual gap between the under side of the band and the band seat. Therefore the two indentations at 48 and 50 diametrically opposite each other will measure the sum of the clearances under the band at points 48 and 50. Since dial gauge 46 measures this sum, the value read on dial 46 as permanent deformation of the band, divided by two equals the average clearance or looseness at points 48 and 50.

Figure 5 shows a modified form of the invention for use when it is desired to employ only the upper indenter and thus make one indentation at a time instead of making them in pairs. Thus a shell 52 is horizontally disposed on a steel base plate 54 which is laid on the platform 16 of a testing machine 2 of any convenient type, such as for example, the type illustrated in Figure 1. The base plate 54 has a transverse cut-out portion or groove 56 as long as the width of the plate 54, and slightly wider than the width of the rotating band 60 of the shell. Thus the shell may be laid horizontally on the base plate with the band 60 lying partly in the groove 56, but with no part of the band 60 in contact with any part of the base plate 54. The movable head 42 of the testing machine 2, as shown in Figure 5, carries a downwardly projecting indenter 28 similar to indenter 28 already described for Figure 1 and the upper part of Figure 6. The use of the layout as shown in Figure 5, is substantially the same as already described for Figure 1, except that there is only a single indentation made in the rotating band, that is, by the upper indenter 28, and it is not necessary to divide the permanent deformation by two as is necessary when indentations are made in pairs.

While the invention has been described in specific terms, it is to be understood that numerous changes in size, shape, materials and arrangement may be made without departing from the spirit and scope of the invention as claimed.

I claim:

1. A method for determining the extent of clearance between a rotating band encircling its band seat on a projectile body comprising: selecting diametrically-opposed peripheral portions on said band of predetermined equal areas, applying equal pressure of a predetermined magnitude simultaneously to the band at said areas sufficient to displace the band portions radially inward toward the band seat to firmly abut the same at diametrically-opposed locations thereon, removing such pressure and then measuring the amount of displacement of such portions, whereby one-half of the total amount of such displacement of the diametrically-opposed portions will be the extent of clearance between the band and the band seat.

2. A method for determining the extent of clearance between a rotating band encircling its band seat on a projectile body comprising: selecting a peripheral portion on said band of a predetermined area, applying pressure of a predetermined magnitude to such area, while holding stationary a part of the band that is diametrically-opposite to said peripheral portion, to displace the portion radially inward to force the same against the band seat, removing such pressure and then measuring the amount of inward displacement of such portion, whereby the inward displacement of such portion will be proportional to the extent of clearance between the band and its band seat.

3. A device for measuring the extent of looseness between a rotating band and its seat on a shell body carrying the band, comprising a support platform, an upstanding V-block and an upstanding lower indenting member on said platform and spaced from said V-block, said V-block and indenting member being constructed and arranged for supporting a shell in horizontal position with the rotating band of the shell resting on said indenting member, an upper indenting member supported above said rotating band and in vertical alignment with said lower indenting member, means constructed and arranged for moving said upper indenting member vertically downward into contact with said rotating band at a location which is 180 degrees angularly displaced from the location of contact of the rotating band with said lower indenting member, press means constructed and arranged for thereupon continuing the said downward motion of said upper indenting member whereby said indenting members are caused to depress said rotating band surface sufficiently to press the underlying portions of the rotating band into tight engagement with its seat on the shell body, means constructed and arranged for measuring the pressure exerted by said press means on said upper indenting member, and means constructed and arranged for measuring the depth by which said indenting members have thus depressed the rotating band surfaces, said upper and lower indenting members comprising projecting columns substantially square and relatively small in cross-section, their contact faces being curved to the same curvature as the surfaces of the rotating band.

PAUL W. KLIPSCH.

REFERENCES CITED

The following references are of record in the file of this patent:

UNITED STATES PATENTS

| Number | Name | Date |
| --- | --- | --- |
| 1,806,767 | Shore | May 26, 1931 |
| 2,019,622 | Meyer | Nov. 5, 1935 |
| 2,259,742 | Edison | Oct. 21, 1941 |
| 2,331,889 | Clark | Oct. 19, 1943 |
| 2,333,640 | Clark | Nov. 9, 1943 |

FOREIGN PATENTS

| Number | Country | Date |
| --- | --- | --- |
| 387,542 | Germany | Dec. 29, 1923 |
| 464,069 | Great Britain | Apr. 12, 1937 |